Nov. 23, 1965  W. P. ROWLAND  3,218,971
PRINTING PLATE
Filed Feb. 14, 1963

INVENTOR.
WILLIAM P. ROWLAND
BY
ATTORNEY

United States Patent Office 3,218,971
Patented Nov. 23, 1965

3,218,971
PRINTING PLATE
William P. Rowland, Southington, Conn., assignor to Rowland Products, Incorporated, Kensington, Conn., a corporation of Connecticut
Filed Feb. 14, 1963, Ser. No. 258,395
4 Claims. (Cl. 101—401.1)

The present invention relates to printing plates of synthetic plastic material.

In Boyajean United States Patent No. 2,575,546, there is described apparatus for inscribing images or patterns in thermoplastic sheet material by a heated stylus which decomposes the thermoplastic material in accordance with an electric impulse produced by a photoelectric scanning device. Other apparatus for inscribing images or patterns in plastic sheet material has been developed using a stylus which chips out or otherwise cuts out the thermoplastic material to provide a sharp line image in response to an electric impulse produced by a photoelectric scanning device.

In connection with the use of such synthetic plastic sheet material for engraving plates, it has heretofore been proposed in Stradar United States Patent No. 2,827,726 to color distinctively one surface of the sheet by use of a solution of a dye and a solvent for both the dye and the thermoplastic sheet material so that the surface of the sheet material to which the solution is applied would be penetrated by the dye solution. Although such sheet has proven advantageous in enabling visual inspection of the image on the inscribed plate, this dyeing technique has been subject to certain limitations in that the solvent-treated surface may require subsequent finishing to ensure uniformity and the desired degree of ink receptiveness, in that the depth of dye penetration and resultant depth of the colored layer may not be uniform throughout the plate or accurately controllable, and in that pigments cannot be employed for more intense coloration or opacity and greater stability of coloration and freedom from migration. Additionally, the very thin depth of the colored layer on the order of 0.1 mil or less has made the colored layer in the inscribed plate susceptible to visual aberration by minor abrasion.

The term "printing plate" as used herein refers both to the inscribed and uninscribed plates of synthetic thermoplastic sheet material.

It is an object of the present invention to provide novel and relatively economical extruded thermoplastic sheet material for printing plates having a differentially colored portion of relatively small and substantially uniform depth with an outer surface which is uniform so as to permit facile inspection of the image inscribed therein.

It is also an object to provide such sheet material wherein pigments may be employed to provide the differential coloring for increased coloration and stability of coloration.

Other objects and advantages will be apparent from the following detailed description and claims and the attached drawing wherein:

Figure 1:
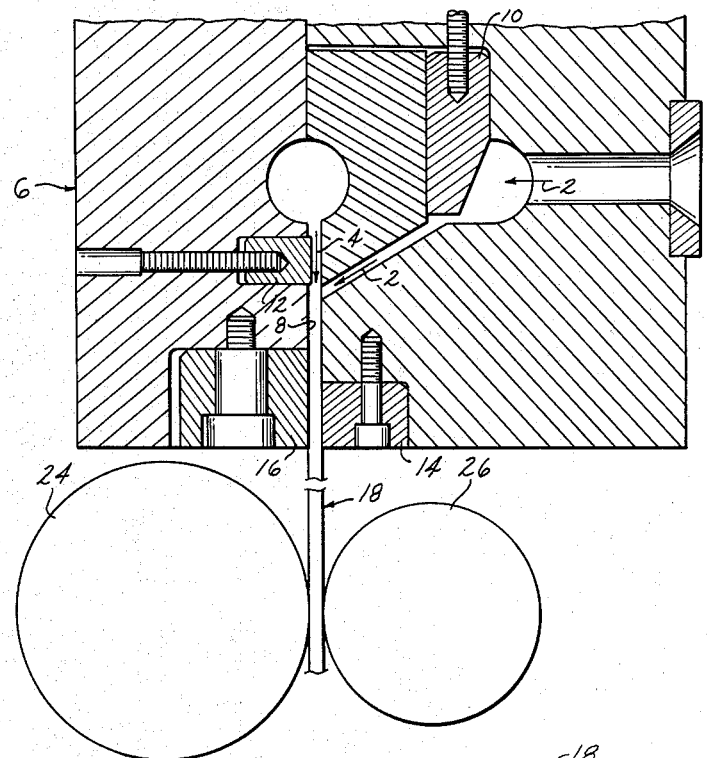
FIGURE 1 is a diagrammatic fragmentary side elevational sectional view of an extrusion die assembly and roll assembly for producing thermoplastic sheet material for use in the present invention.

It has now been found that the foregoing and related objects may be readily attained by a method in which a pair of streams of synthetic thermoplastic material are fed into a common cavity of an extrusion die assembly to form layers of a single stream of thermoplastic material extruded from the die lips or discharge opening of the extrusion die and thereby to produce an integrally formed sheet having layers which are of substantially uniform thickness throughout and fused together along the interface therebetween to provide an integral sheet. The amount and pressure of the two streams are controlled so as to produce one layer which is about 1 to 10 percent of the total thickness of the extruded sheet material, and this one layer contains coloring material visually differentiating it from the other layer. The extruded sheet material from the extrusion die is passed into the nip between a pair of rolls which impart a uniform and predetermined surface finish at least to the surface of the sheet material provided by the differentially colored one layer. Thereafter, in the inscribing operation, portions of the one layer are removed by a stylus or other tool to provide an inscribed printing plate wherein the image or pattern is visually defined by the color of the remaining portions of the one layer, thus permitting facile visual inspection of the image on the inscribed printing plate.

The finished printing plate thus is formed of an extruded sheet of a synthetic thermoplastic material which is integrally formed with a base layer and a top layer, each of substantially uniform thickness throughout. The top layer contains coloring matter visually differentiating it from the base layer and is about 1 to 10 percent of the total thickness of the extruded sheet material so that it may be readily removed by an engraving stylus during the inscribing operation but of sufficient depth so that minor abrasions occurring during use or handling will not substantially affect the quality of the visual image defined by the color of the unremoved portions of the top layer. The top surface of the extruded sheet material is of substantially uniform finish and can be predetermined to provide the desired degree of ink retention by the surface of rolls between which the sheet passes after leaving the extruder, thus eliminating any requirement for subsequent polishing or other surface treatment of the sheet.

Various types of synthetic thermoplastic resins may be employed, including cellulose acetate, cellulose acetate-butyrate, cellulose propionate, cellulose nitrate, polyethylene, polystyrene, vinyl chloride, and vinyl chloride-vinyl acetate. Cellulose esters, and particularly cellulose acetate and cellulose acetate-butyrate, are highly advantageous because of the ease and cleanliness with which chips are removed from sheet material formed therefrom by a cutting-type stylus.

In making the printing plate, the differentially colored layer which forms the top surface of the sheet to be removed should be relatively thin and about 0.0005 to 0.005 inch. For most apparatus, the total thickness of the extruded sheet is about 0.025 to 0.050 inch, although greater thicknesses may be employed for some applications. Sheet having a colored top layer of 0.001 to 0.003 inch and a total thickness of 0.035 to 0.045 inch has been particularly preferable for the most widely employed apparatus.

Although dyes may be employed in providing the coloring matter in the top layer, pigments or non-soluble coloring materials have proven especially advantageous because of the high degree of color intensity or hiding power provired by relatively small amounts in relatively thin layers, as well as because of their superior stability to light and heat and resistance to migration. Among the pigments which may be employed to provide a highly colored or preferably substantially opaque top layer are carbon black, bone black, ceramic black, iron oxides, ultramarine blue, cobalt aluminate, cadmium mercury, cadmium sulfo-selenide, phthalocyanine, and indanthrone. Generally, the pigment is used in a minor amount sufficient to impart a high degree of color differentiation or opacity to the top layer and may be used in amounts of 0.1 to 2.0 percent by weight of the top layer feed and preferably about 0.5 to 1.2 percent by weight. Generally, black pigments are preferred because of the high degree of opacity provided by a relatively small amount of pigment. Although the synthetic plastic for the base layer may contain coloring matter distinct from that used for the top layer, the opacity or coloration of the top layer is sufficiently distinguishing so that clear or uncolored material is most advantageously employed.

Figure 2:
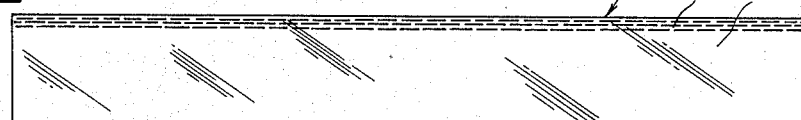
FIGURE 2 is a fragmentary side elevational view to an enlarged scale of thermoplastic sheet in accordance with the present invention.

Referring now in detail to the attached drawing, FIGURE 1 diagrammatically illustrates the process for making printing plate sheet material of FIGURE 2 in accordance with the present invention wherein a first stream of molten synthetic thermoplastic resin diagrammatically represented by the arrows 2 and a second stream of the molten thermoplastic resin diagramatically represented by the arrows 4 are fed to the extrusion die assembly 6 by extrusion presses (not shown). The relative amount of each stream of thermoplastic resin fed to the manifold chamber 8 can be varied by the movable restrictor or choke bars 10, 12 to control the relative depth of the layers of each feed stream in the composite stream passing through the discharge opening between the stationary die lip 14 and the movable die lip 16. As is conventional, the total thickness of the extruded sheet material generally designated by the numeral 18 may be varied by adjustment of the movable die lip 16.

The stream 4 contains coloring matter so that it produces a top layer or portion 20 in the extruded sheet material 18 which is differentially colored with respect to the base layer or portion 22. The extruded sheet material 18 after leaving the die lips 14, 16 is passed between a pair of rolls 24, 26 which chill the sheet material 18, and the surface of the roll 24 simultaneously will provide the desired uniform surface characteristics to the top surface of the sheet material 18. By use of a highly polished surface on the roll 24, a mirror surface can be provided; by producing substantially controlled and uniform depressions in the surface of the roll 24 by engraving or other means, a matte or more highly ink-retaining surface can be provided upon the sheet material for use on certain types of materials.

Figure 4:
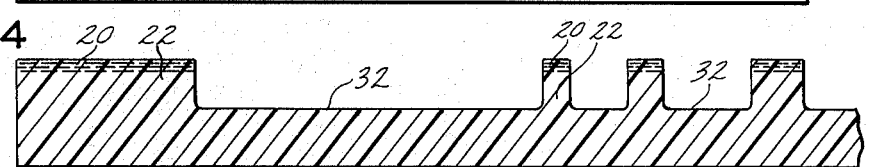
FIGURE 4 is a fragmentary cross-sectional view to an enlarged scale along the line 4—4 of FIGURE 3.
Figure 3:
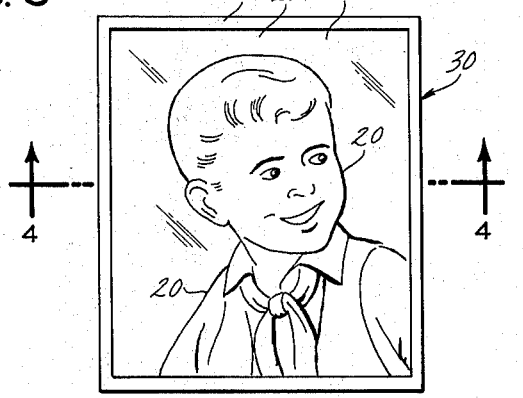
FIGURE 3 is a plan view of an inscribed printing plate produced in accordance with the present invention.

Referring now to FIGURES 3 and 4, therein illustrated is an inscribed plate generally designated by the numeral 30 which is produced in accordance with the present invention. Portions of the plate 30 have been removed to produce a number of cavities designated by the numeral 32 and which extend to a depth below the colored top layer 20. The unremoved portions of the top surface are of uniform surface characteristics and will carry ink upon their surface to produce the desired printed image. As illustrated, the inscribed plate can be visually inspected to determine the accuracy of the engraving since the color of the unremoved top layer 20 of these unremoved portions readily distinguishes them from the inscribed portions which carry the color (or lack thereof) of the base layer 22.

Illustrative of the efficacy of the present invention is the following specific example.

*Example*

To an extrusion die assembly generally in accordance with that illustarted in FIGURE 1 were fed two streams of molten general-purpose cellulose acetate plasticized with triphenyl phosphate and diallyl phthalate. The stream from the cross-head extruder indicated by the numeral 4 in FIGURE 1 contained about 1 percent by weight of carbon black. The extrusion temperature was about 400 degrees Fahrenheit and the extrusion rate was about 125 pounds per hour of 12 inch wide sheet of 0.040 inch total thickness. The restrictor bars were regulated to control the amounts of the two feeds and to produce a base layer of about 0.037 inch and a colored top layer of about 0.003 inch which was effectively an opaque black in color. The extruded sheet issuing from the extrusion die then was passed between a pair of rolls, the roll contacting the top surface being highly polished to impart a mirror-like, highly polished surface to the extruded sheet.

The resultant sheet was cut into rectangular printing plates which were then placed upon a revolving cylinder and a stylus actuated by electrical impulse produced by photoelectric scanning of an image cut out portions of the plate through the colored top layer and into the clear base layer. The lines of the image produced by the removed portions were sharp and the image was clearly presented by the color of the unremoved portions of the top layer.

Thus, it can be seen that the present invention provides a novel and relatively economical printing plate extruded of synthetic thermoplastic sheet material having a differentially colored surface portion of relatively small and substantially uniform depth with a controllable and uniform surface for predetermined quality of ink receptiveness or retention. The printing plates most desirably may utilize pigments to provide more opaque and stable coloration and are substantially free from visual aberration of the image due to minor surface abrasions occurring during handling.

Although but one specific embodiment of the invention has been shown and described herein, it will be understood that modifications may be made within the spirit of the invention.

Having thus described the invention, I claim:

1. A printing plate comprising an extruded sheet of synthetic thermoplastic material integrally formed with a base layer and a top layer each of substantially uniform thickness throughout, each of said layers being of substantially the same synthetic thermoplastic material and fused together along the interface therebetween to provide an integral sheet, said top layer containing pigment visually differentiating said top layer from said base layer, said top layer having a substantially uniform outer surface finish, said sheet being about 0.025 to 0.050 inch in thickness and said top layer being about 1 to 10 percent of the thickness of said sheet and about 0.001 to 0.005 inch in thickness.

2. The printing plate in accordance with claim 1 wherein said synthetic thermoplastic material is a cellulose ester.

3. The printing plate in accordance with claim 1 wherein said outer surface finish is highly polished.

4. The printing plate in accordance with claim 1 wherein said outer surface finish is a matte finish.

References Cited by the Examiner

UNITED STATES PATENTS

| | | | |
|---|---|---|---|
| 2,791,801 | 5/1957 | Szantay | 18—10 |
| 2,827,726 | 3/1958 | Stradar | 101—401.1 |
| 2,901,770 | 9/1959 | Beck | 18—13 |

DAVID KLEIN, *Primary Examiner.*

WILLIAM PENN, *Examiner.*